Patented July 30, 1935

2,009,757

UNITED STATES PATENT OFFICE 2,009,757

TREATMENT OF TOLUIDINE BASES

William Henry Bentley, Wallasey, and Benjamin Catlow, Oswaldtwistle, England, assignors to William Blythe & Company Limited, Holland Bank Chemical Works, England, a British company No Drawing. Application July 20, 1931, Serial No 552,064. In England August 12, 1930

11 Claims. (Cl. 260—130.5)

This invention relates to the treatment of toluidine bases.

One object of the invention is to separate para-toluidine from admixture with ortho-toluidine. Another object is to form new compounds of para-toluidine with sulphur dioxide which are solid at ordinary temperatures and can be used conveniently and effectively as a means for separating para-toluidine from admixture with other substances especially analogous or isomeric bases such as ortho-toluidine. A further object is to separate into its components a mixture of ortho- and para-toluidine such as is obtained by direct reduction of the technical mono-nitration product of toluene. The product obtained by this direct reduction is a fluid mixture of toluidines consisting mainly of the ortho- and para-isomers approximately in the proportion of 2 to 1 respectively. It is usually distilled from the reaction mixture with steam, thus becoming saturated with water.

Many methods have been proposed for the separation of the isomers from this mixture and though these methods are on the whole successful they possess the disadvantage of being tedious on account of their incompleteness whereby the operations may need frequent repetition before complete separation is achieved.

Now we have found that we can separate para-toluidine from admixture with ortho-toluidine by treating the mixture with a limited quantity of sulphur dioxide preferably in the presence of a small proportion of water. By this treatment a solid compound of para-toluidine, sulphur dioxide and water is precipitated which can be separated by filtration and good pressing. In the absence of water a solid compound of para-toluidine and sulphur dioxide is also obtained but the separation of the para-toluidine from the mixture is very much less complete when water is absent.

The composition of the solid compound when water is present corresponds approximately to the chemical formula $$2C_7H_9N, SO_2, H_2O.$$

The composition of the solid compound when water is not present corresponds approximately to the formula $$2C_7H_9N, SO_2.$$

In using the expression "limited quantity" we mean that the quality of sulphur dioxide employed, although it may be larger than that theoretically necessary to form a double compound with the para-toluidine (i. e. 1 molecule for each 2 molecules of para-toluidine) is very substantially less than would be necessary to combine with all the toluidines present. The proportion of water is kept as low as possible and need not exceed one molecule for each molecule of sulphur dioxide.

Crude toluidine (containing about one third of its weight of para-toluidine) when saturated with water, for example after being submitted to steam distillation, contains about 5 to 6 per cent. of water and we have found that this is a suitable proportion for the production of the double compound of para-toluidine with sulphur dioxide and water, although slightly larger than that indicated by the equation. The quantity of sulphur dioxide most suitable for treatment of such a mixture is about 50% more than is theoretically necessary, but this is very much less than would be required to combine with all the ortho-toluidine present in the mixture.

The successful separation probably depends upon the sparing solubility of the para-toluidine compound in ortho-toluidine at the ordinary temperature.

When moderately heated (80–100° C.) preferably under reduced pressure the double compounds part with their sulphur dioxide or sulphur dioxide and water leaving practically pure para-toluidine which solidifies on cooling.

The oil from which the aforesaid solid compound of para-toluidine, sulphur dioxide and water has been separated approaches in composition the ortho-toluidine of commerce. It differs from the latter in containing a little more para-toluidine as well as a small amount of sulphur dioxide and water. Its further treatment is to be decided by the requirements of circumstances.

If, for example, the oil is utilizable as such, the small quantity of sulphur dioxide and water may be removed if necessary by the application of heat, preferably under reduced pressure, or alternatively the oil may be washed with a small amount of caustic alkali.

If, however, a technically pure ortho-toluidine base is required, then the oil may be mixed with about 10 per cent of its weight of fifty per cent. sulphuric acid and distilled in steam whereby technically pure ortho-toluidine distills over and is collected. Alternatively if technically pure ortho-toluidine hydrochloride is required the oil may be mixed with a slight excess of a molecular proportion of 30 per cent. hydrochloric acid, and, after thorough cooling of the mixture, the crystalline ortho-toluidine hydrochloride so produced removed from the aqueous mother liquor by filtration or hydro-extraction. Such methods of isolating technically pure ortho-toluidine or its hydrochloride are known per se.

In the last two methods of treatment sulphur dioxide is first evolved and this should be collected and utilized in any suitable manner.

The residual aqueous liquors in both cases contain besides ortho-toluidine, the small remainder of the para-toluidine originally present in the starting material (i. e. the crude toluidine) and these may be suitably treated with alkali to liberate the toluidine bases which can then be added to another batch of crude toluidine for further treatment with sulphur dioxide. If preferred, the liberated toluidine bases may be treated separately.

It is known that crude toluidine obtained by the mono-nitration of toluol and direct reduction of the product contains a small proportion of meta-toluidine but no separation of this isomer is effected by this invention and the small proportion of meta-toluidine present in the original crude base remains, after the separation of the para-toluidine, with the ortho-toluidine and is reckoned as such.

In illustration of the manner by which we may carry out our invention we quote the following example:—

Wet crude toluidine (700 parts by weight) obtained by mono-nitration of toluol, subsequent reduction of the product and steam distillation and containing approximately 32 per cent of para-toluidine and 5 to 6 per cent of water is allowed to absorb sulphur dioxide (95 parts by weight) preferably under agitation and without cooling below 80° C. After operation the oily liquid is cooled and thereby becomes semi-solid owing to the formation of the crystalline compound. The product is preferably cooled below 15° C. and then filter pressed as dry as possible. The press cake is afterwards placed in a jacketed pan and warmed by hot water or steam in the jacket to a temperature of 80-100° C. This causes an evolution of sulphur dioxide which is led away by a pipe and utilized in a subsequent operation or in any other desired manner.

Towards the end of the evolution of the sulphur dioxide the removal of the last portions of the sulphur dioxide may be assisted by reducing the pressure in the pan by means of a suction pump or by the passage of an inert gas through the molten mass. When the sulphur dioxide has ceased to be evolved the liquid contents of the pan consisting of para-toluidine base are run out or bailed out of the pan into moulds to cool and solidify.

If the evolution of sulphur dioxide in the last operation has been imperfect with the consequence that the para-toluidine base is contaminated with a little sulphur dioxide (or with sulphate due to oxidation by contact with air) the para-toluidine base may be purified by suitably washing it with dilute caustic alkali and afterwards with water and then drying again.

When the operations have been properly carried out the melting point of the para-toluidine base is approximately 45° C. which is clear evidence of the purity of the product.

If, however, the operations have been imperfect and the melting point of the para-toluidine is lower than is desirable it may be purified and its melting point thereby raised by hydro-extraction or hydraulic pressing at suitably elevated temperatures approaching that of its melting point. The yield of the para-toluidine compound is approximately 270 parts and of para-toluidine base from the same 198 parts the yield being about 90 per cent. of that theoretically possible.

The oil from the aforementioned press cake as stated in the introduction, is mainly ortho-toluidine. It still contains about 4 per cent of para-toluidine and if circumstances demand the preparation of technically pure ortho-toluidine base or hydro-chloride it may be treated in either of the ways described or by any other suitable known method.

By either of the two methods mentioned a residual aqueous liquor remains containing in addition to ortho-toluidine the rest of the para-toluidine contained in the original crude toluidine. This liquor is concentrated if necessary and treated with caustic soda or other alkaline agent in order to liberate the mixed toluidine bases which are then suitably removed and added to more crude toluidine for further treatment with sulphur dioxide. If preferred, however, this residual oil may be kept apart and allowed to accumulate until the quantity is large enough to be submitted separately to the above described treatment with sulphur dioxide.

We declare that what we claim is:—

1. Process for isolating para-toluidine from admixture with ortho-toluidine which includes the step of treating the mixture with sulphur dioxide to bring about reaction between said para-toluidine and said sulphur dioxide and separating the solid compound formed by said reaction from the mixture.

2. Process for isolating para-toluidine from admixture with ortho-toluidine which includes the step of treating the mixture with sulphur dioxide in presence of water to bring about reaction between said para-toluidine, sulphur dioxide and water and separating the solid compound formed by said reaction from the mixture.

3. Process for isolating para-toluidine from admixture with ortho-toluidine which includes the steps of treating the mixture with a quantity of sulphur dioxide not substantially in excess of that required to combine with the para-toluidine, bringing about a reaction between said para-toluidine and said sulphur dioxide to form a solid compound therewith, and then separating said solid compound from the mixture.

4. Process for separating para-toluidine from admixture with ortho-toluidine which consists in treating the mixture with sulphur dioxide in presence of water, the quantity of said sulphur dioxide and said water being not substantially in excess of that required to combine with the para-toluidine, bringing about a reaction between said para-toluidine, sulphur dioxide and water to form a solid compound, separating said solid compound from the mixture and then splitting off sulphur dioxide from said solid compound.

5. Process for separating para-toluidine from admixture with ortho-toluidine as claimed in claim 4 in which the said solid compound is decomposed by heating to yield free toluidine.

6. Process for separating para-toluidine from admixture with ortho-toluidine as claimed in claim 4 in which the said solid compound is separated from the mixture by filtration and is pressed to remove adherent ortho-toluidine.

7. Process for separating para-toluidine from admixture with ortho-toluidine which consists in treating the mixture with sulphur dioxide to bring about reaction between said para-toluidine and said sulphur dioxide, separating the solid compound formed by said reaction from the reaction mixture by filtration and pressing and decomposing it to yield a base consisting mainly of para-toluidine.

8. Process for separating para-toluidine from admixture with ortho-toluidine which consists in treating the mixture with a quantity of sulphur dioxide not substantially in excess of that required to combine with the para-toluidine, bringing about a reaction between said para-toluidine and said sulphur dioxide to form a solid compound, separating said solid compound from the reaction mixture and decomposing said solid compound to yield a base consisting mainly of para-toluidine.

9. Process for separating para-toluidine from admixture with ortho-toluidine which consists in treating the mixture with a quantity of sulphur dioxide and water not substantially in excess of that required to combine with the para-toluidine, bringing about a reaction between said para-toluidine, sulphur dioxide and water to form a solid compound, separating said solid compound from the reaction mixture and decomposing said solid compound by heat to yield a base consisting mainly of para-toluidine.

10. Process for separating para-toluidine from admixture with ortho-toluidine which consists in treating the mixture with a quantity of sulphur dioxide not substantially in excess of that required to combine with the para-toluidine, bringing about a reaction between said para-toluidine and said sulphur dioxide to form a solid compound, and then separating the solid compound so formed from the reaction mixture and decomposing it to liberate para-toluidine.

11. Process for isolating para-toluidine from admixture with ortho-toluidine which includes the steps of treating the mixture with a quantity of sulphur dioxide and water not substantially in excess of that required to combine with the para-toluidine, bringing about a reaction between said para-toluidine, sulphur dioxide and water to form a solid compound and then separating the solid compound so formed from the reaction mixture.

WILLIAM HENRY BENTLEY.
BENJAMIN CATLOW.